United States Patent
Senofonte

(10) Patent No.: US 9,309,833 B2
(45) Date of Patent: Apr. 12, 2016

(54) LEAF SPRING HANGER FOR EXHAUST DUCT LINER

(71) Applicant: Paul R. Senofonte, Jupiter, FL (US)

(72) Inventor: Paul R. Senofonte, Jupiter, FL (US)

(73) Assignee: United Technologies Corporation, Hartford, CT (US)

( * ) Notice: Subject to any disclaimer, the term of this patent is extended or adjusted under 35 U.S.C. 154(b) by 772 days.

(21) Appl. No.: 13/656,820

(22) Filed: Oct. 22, 2012

(65) Prior Publication Data

US 2014/0109592 A1  Apr. 24, 2014

(51) Int. Cl.
*F02K 1/82* (2006.01)
*F02K 1/80* (2006.01)
*F23R 3/60* (2006.01)
*F02C 7/20* (2006.01)
*F16B 21/02* (2006.01)
*F16L 55/035* (2006.01)
*F16B 5/10* (2006.01)

(52) U.S. Cl.
CPC ... *F02K 1/82* (2013.01); *F02C 7/20* (2013.01); *F02K 1/805* (2013.01); *F16B 21/02* (2013.01); *F16L 55/035* (2013.01); *F23R 3/60* (2013.01); *F05D 2240/57* (2013.01); *F05D 2260/38* (2013.01); *F16B 5/10* (2013.01); *F23R 2900/00012* (2013.01); *Y10T 29/49947* (2015.01)

(58) Field of Classification Search
CPC ..................... F02K 1/82; F23R 3/60
See application file for complete search history.

(56) References Cited

U.S. PATENT DOCUMENTS

| | | | | |
|---|---|---|---|---|
| 2,551,400 A | * | 5/1951 | Sorensen | F16B 5/10 411/555 |
| 2,795,108 A | * | 6/1957 | Saldin | F23R 3/60 138/113 |
| 2,846,842 A | * | 8/1958 | Brown | F02K 1/80 239/265.41 |
| 3,785,407 A | * | 1/1974 | Waite | F16L 59/13 138/108 |
| 3,826,088 A | | 7/1974 | Nash et al. | |
| 4,864,818 A | | 9/1989 | Taylor | |
| 5,059,055 A | | 10/1991 | DeGress et al. | |
| 6,125,627 A | * | 10/2000 | Rice | F23R 3/28 60/231 |
| 7,017,334 B2 | | 3/2006 | Mayer et al. | |
| 7,089,748 B2 | | 8/2006 | Tiemann | |
| 7,581,399 B2 | | 9/2009 | Farah et al. | |
| 7,861,535 B2 | | 1/2011 | Figueroa | |
| 7,975,488 B2 | | 7/2011 | Farah et al. | |
| 2002/0184892 A1 | * | 12/2002 | Calvez | F23R 3/60 60/796 |
| 2007/0158527 A1 | | 7/2007 | Farah et al. | |
| 2008/0022689 A1 | | 1/2008 | Farah et al. | |
| 2009/0293498 A1 | | 12/2009 | Petty et al. | |
| 2010/0089068 A1 | * | 4/2010 | Ellis | F23R 3/60 60/796 |

\* cited by examiner

*Primary Examiner* — Gerald L Sung
*Assistant Examiner* — Scott Walthour
(74) *Attorney, Agent, or Firm* — Carlson, Gaskey & Olds, P.C.

(57) ABSTRACT

A hanger assembly for use between a first duct and a second duct has a flexible leaf spring having a body and a leg, a locking member for attaching the leg to the first duct, and a mounting member for attaching the body to the second duct.

16 Claims, 3 Drawing Sheets

LEAF SPRING HANGER FOR EXHAUST DUCT LINER

BACKGROUND

A gas turbine engine typically includes a fan section, a compressor section, a combustor section, a turbine section, and in some configurations an augmenter section. A liner extending aft of the turbine section typically referred to as an exhaust or augmenter liner includes an inner liner exposed to hot exhaust gases. The inner liner is typically spaced from an outer structure with a plurality of hanger assemblies. The hanger assemblies are required to accommodate misalignment, complex shapes, large thermal growth differentials, significant pressure loads and high temperatures. Moreover, the hangers are positioned within a confined physical envelope that is difficult to access while accommodating relative movement within several planes simultaneously.

Accordingly, it is desirable to design and develop a reduced cost hanger that performs as desired in the harsh environment of the exhaust duct while also simplifying assembly and reducing cost.

SUMMARY

According to an embodiment disclosed herein, a hanger assembly for use between a first duct and a second duct includes a flexible leaf spring having a body and a leg, a locking member for attaching the leg to the first duct, and a mounting member for attaching the body to the second duct.

According to any prior embodiment disclosed herein, the body includes a circular portion extending therefrom.

According to any prior embodiment disclosed herein, the body has an opening therein cooperating with a stud extending from the second duct.

According to any prior embodiment disclosed herein, a first portion of the leg extends from the body at an inner obtuse angle.

According to any prior embodiment disclosed herein, a second portion of the leg extends from the first portion of the leg at an inner acute angle.

According to any prior embodiment disclosed herein, a third portion of the leg extends from the second portion of the leg at an outer acute angle.

According to any prior embodiment disclosed herein, the locking member includes a cover, a first flange formed upon the cover and extending from cover towards the body and a second flange extending from the first flange at an outer obtuse angle, wherein the first flange and the second flange capture the leg.

According to any prior embodiment disclosed herein, the leg has a portion disposed at an acute angle, such portion captured by the first flange and the second flange wherein the acute angle and the obtuse angle are complementary to each other.

According to any prior embodiment disclosed herein, the second flange is wider than the portion.

According to a further embodiment disclosed herein, a gas turbine engine includes a fan section including a plurality of fan blades rotatable about an axis; a compressor section in communication with the fan section; a combustor in fluid communication with the compressor section; a turbine section in fluid communication with the combustor and driving the fan section and the compressor section; and an exhaust liner aft of the turbine section, the exhaust liner including a liner defining an inner surface exposed to exhaust gases, a duct spaced radially outward of the liner; and a hanger assembly supporting the liner relative to the duct, the hanger assembly including a flexible leaf spring having a body and a leg, a locking member attaching the leg to the duct; and a mounting member attaching the body to the liner.

According to any prior embodiment disclosed herein, a first portion of the leg extends from the body at an inner obtuse angle, wherein a second portion of the leg extends from the first portion of the leg at an inner acute angle and wherein a third portion of the leg extends from the second portion of the leg at an outer acute angle.

According to any prior embodiment disclosed herein, the locking member includes a cover disposed outside of the casing, a first flange formed upon the cover and extending from cover towards the body and a second flange extending from the first flange at an outer obtuse angle, wherein the first flange and the second flange capture the leg.

According to any prior embodiment disclosed herein, the leg has a portion disposed at an acute angle, such portion captured by the first flange and the second flange wherein the acute angle and the obtuse angle are complementary to each other.

According to a still further embodiment disclosed herein, a method of supporting a liner of a gas turbine engine includes the steps of providing a flexible leaf spring having a body and a leg, a locking member for attaching the leg to the first duct and a mounting member for attaching the body to the second duct, providing an opening in the first duct, and inserting the leaf spring through the opening.

According to any prior embodiment disclosed herein, the method includes the further step of arranging the leaf spring so that a thickness of the leaf spring is parallel to flow passing between the first and second ducts.

According to any prior embodiment disclosed herein, the method includes the further step of attaching the body of the leaf spring to a stud extending from the second duct.

According to any prior embodiment disclosed herein, the method includes the further step of inserting the lock member through the opening, and rotating the lock member to capture the leg between the lock member and the first duct.

According to any prior embodiment disclosed herein, the method includes the further step of providing a cover for covering the opening over the opening, the cover having the lock member attaching thereto, and putting the cover on the first duct such that the lock member extends through the opening without engaging the leg.

According to any prior embodiment disclosed herein, the method includes the further step of rotating the cover and the lock member to lock the leg between the lock member and the first duct.

These and other features disclosed herein can be best understood from the following specification and drawings, the following of which is a brief description.

DETAILED DESCRIPTION

Figure 1:
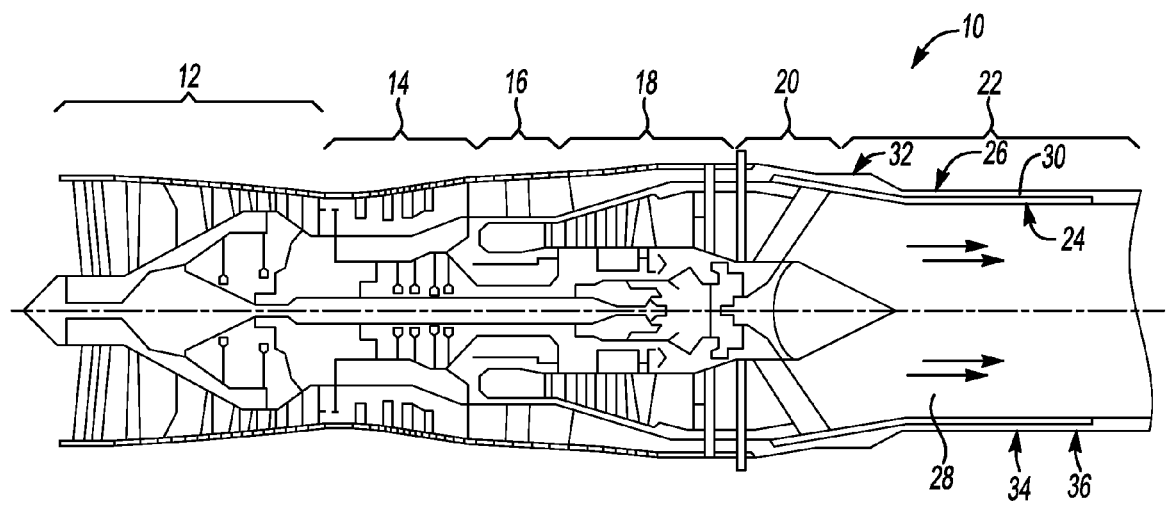
FIG. 1 shows a sectional view of a gas turbine engine incorporating an embodiment of a leaf spring hanger shown herein.

Referring to FIG. 1, a gas turbine engine 10 includes a fan section 12, a compressor section 14, a combustor section 16, and a turbine section 18. Air entering into the fan section 12 is initially compressed and fed to the compressor section 14. In the compressor section 14, the incoming air from the fan section 12 is further compressed and communicated to the combustor section 16. In the combustor section 16, the compressed air is mixed with gas and ignited to generate a hot exhaust stream 28. The hot exhaust stream 28 is expanded through the turbine section 18 to drive the fan section 12 and the compressor section 14. In this example, the gas turbine engine 10 includes an augmenter section 20 where additional fuel can be mixed with the exhaust gasses 28 and ignited to generate additional thrust. The exhaust gasses 28 flow from the turbine section 18 and the augmenter section 20 through an exhaust liner assembly 22.

The example exhaust liner assembly 22 includes a liner 24 that defines an inner surface exposed to the hot exhaust gasses 28. The liner 24 (e.g., a first duct) is supported by a duct 26 (e.g., a second duct) disposed radially outward of the liner 24. An annular space 30 is disposed between the liner 24 and the duct 26 for a cooling airflow. The example exhaust liner assembly 22 includes a first section 32, a second section 34, and third section 36. Each of the first, second and third sections 32, 34, 36 are movable relative to each other to provide a thrust vectoring function. As appreciated, although the gas turbine engine 10 is disclosed and described by way of example and other configurations and architectures of gas turbine engines are within the contemplation of this disclosure and would benefit from the disclosures within this application.

Figure 2:
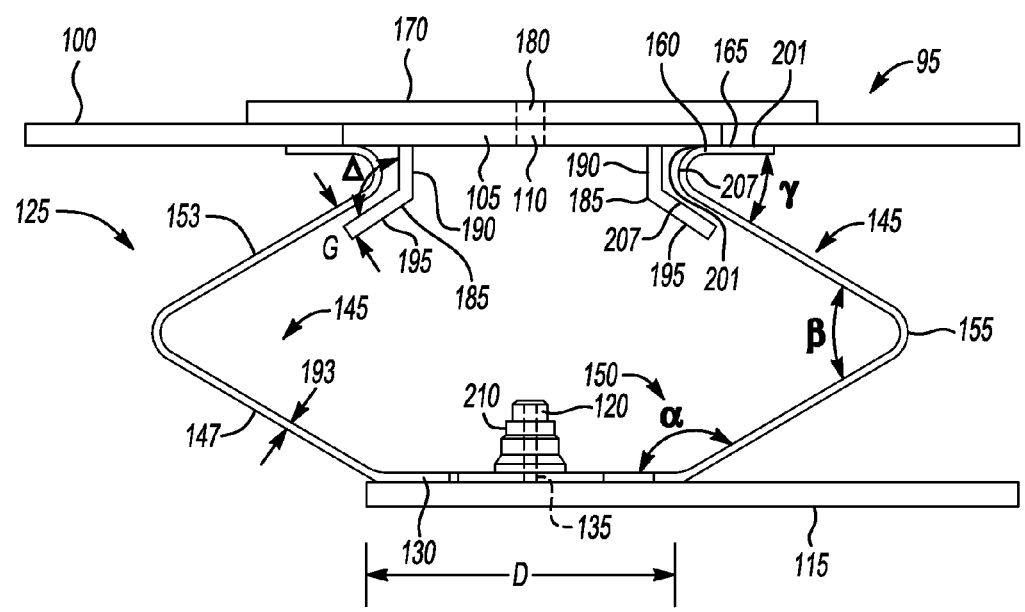
FIG. 2 shows a side view leaf spring hanger embodiment for use in then engine of FIG. 1.

Referring to FIG. 2 a leaf spring hanger assembly 95 is shown. A casing/outer duct 26/100 has a major opening 105 (see also FIGS. 4 and 5) and a plurality of bolt holes 110 as will be discussed herein (See FIG. 4).

Liner/inner duct 24/115 is disposed within the casing/outer duct 26/100. A plurality of studs 120 are fixedly attached to the liner 115 as are known in the art (see FIGS. 2 and 5). A leaf spring 125 has a flat body 130 that touches the liner 115 along a length D of the flat body 130. The flat body 130 has an orifice 135 extending therethrough (see also FIG. 5) for extending around the stud 120 protruding from the liner 115. The flat body 130 has a portion 140 (FIG. 5), which may be circular, that extends around the central opening orifice 135 to provide load support of the flat body along a greater surface area of the liner 115. The flat body 130 has a pair of integrally formed legs 145. The legs 145 have a first bend portion 150 that forms an inner side obtuse angle α relative to the flat body portion 130. The legs extend away from the first bend portion 150 to the second bend portion 155 that forms an inner side acute angle β, and extend to a third bend portion 160 that forms an outer side acute angle γ. The end portion 165 of each leg 145 is parallel to the casing 100 and roughly parallel to the flat body portion 130.

The legs 145 have a first portion 147 between the first bend portion 150 and the second bend portion 155, a second portion 153 between the second bend portion 155 and the third bend portion 160 and end portion 165. The wear areas 201 that extend from second portion 153 around the third bend 160 to the third leg may be coated with a coating 207 to minimize wear on the rubbing surfaces. Alternatively portions of the first flange 190, the second flange 195 and the casing 100 or combinations thereof may also be coated with a coating 207.

Figure 3:
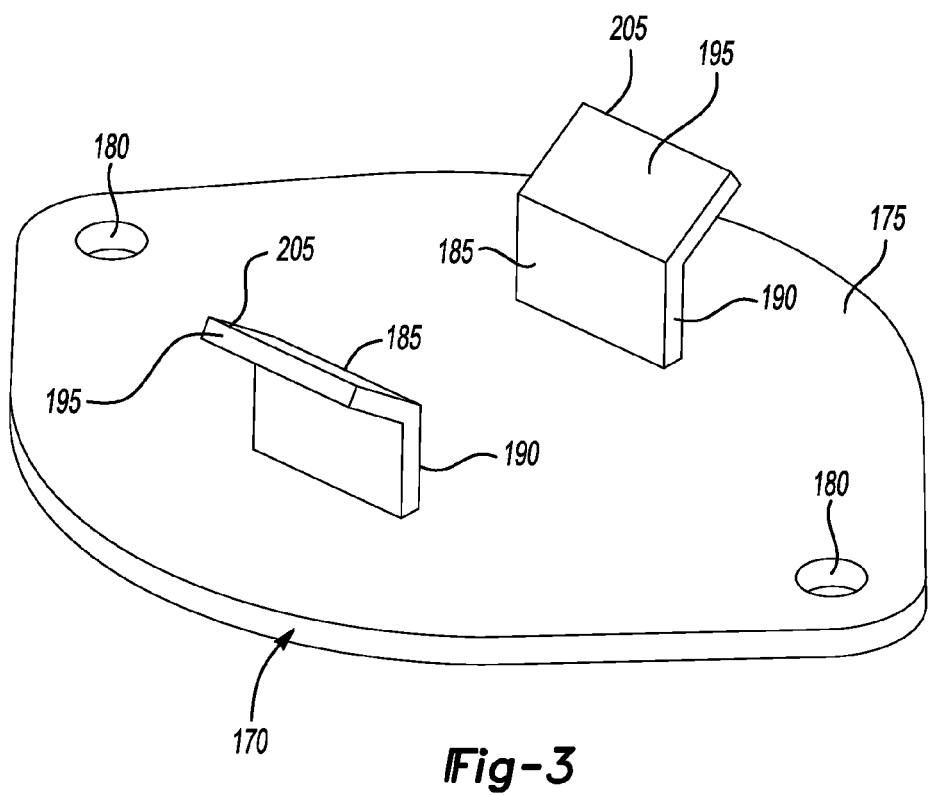
FIG. 3 shows a perspective view of a cover for use as a part of the hanger assembly as shown in FIG. 2.

Referring now to FIG. 3, cover 170 has a roughly elliptical body 175 having a pair of apertures 180 that align with holes 110 in the casing 100 for attachment thereto. Each of a pair of locking tabs 185 have a first flange 190 perpendicular to the body 175 and a second flange 195 extending at an outer obtuse angle Δ from the first flange 190. The second flanges 195 extend away from each other and the first flanges 190 are in parallel to each other. The second flanges have an outer end 205 that fit within major opening 105 (see FIG. 4). The outer ends 205 may be slightly smaller than a diameter of the major opening 105 to allow insertion of the cover by tilting one side of the cover 170, inserting one of the first flanges 190 on the tilted side into the major opening 105 until the casing 100 engages the first flange 190 and then tilting another side of the cover 170 and its other flange 190 through the major opening 105.

Figure 4:
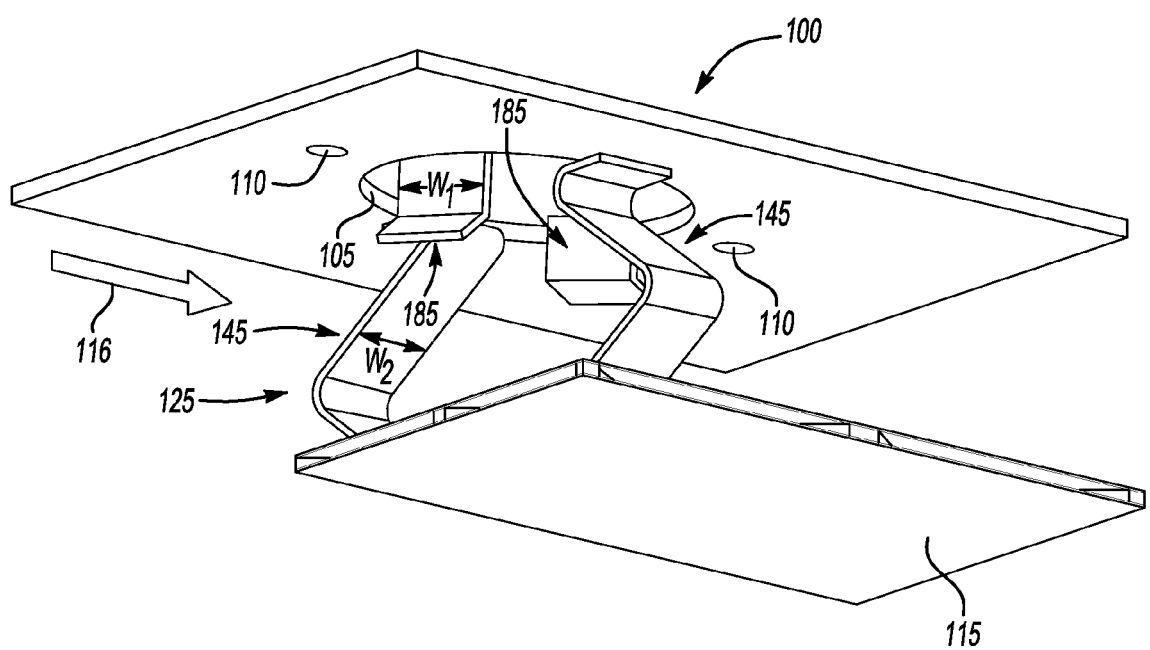
FIG. 4 shows a perspective view of the leaf spring assembly as used in FIG. 2.
Figure 5:
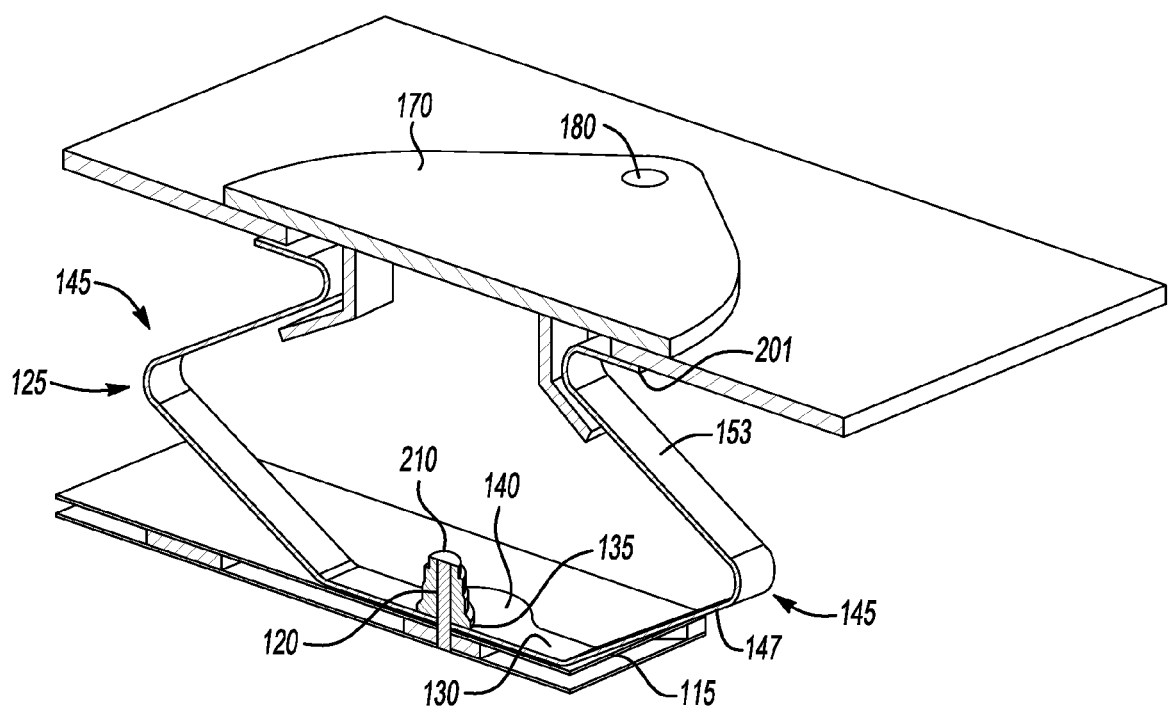
FIG. 5 shows a sectional, perspective view of the leaf spring hanger assembly of FIG. 4.

In order to construct the hanger assembly as seen in FIGS. 4 and 5, leaf spring 125, which is flexible, is manipulated and compressed so its body 130 and its legs 145 fits through the major opening 105. The orifice 135 of the leaf spring 125 is inserted over the stud 120 and then secured thereto by a nut 210. The width of the leaf spring is arranged parallel to the flow 116 so that the narrow width of the leaf spring 125 minimizes obstructions to flow 116 passing between the casing 100 and the liner 115. The width W1 of the first and second flanges 190, 195 is greater than the width W2 of the leaf spring 125 to accommodate any axial movement of the casing 100 relative to the liner 115 that would tend to move the leaf spring axially relative to the casing 100 so the leaf spring remains locked relative to the casing 100.

After the leaf spring 125 is secured to the liner 115, cover 170 is inserted into the major opening 105 so that the locking tabs 185 do not interfere with the leaf spring 125 (see FIG. 4). Cover 170 is then rotated so that the apertures 180 align with the holes 110 and the locking tabs 185 are in parallel with the leaf spring 125 such that the third bend 160 of each leg is disposed between each locking tab 185 and the casing 100. There may be a gap G between the legs 145 and the locking tabs 185 to allow for relative motion between the parts. The angle γ and the angle Δ are complementary (see FIG. 2) so that the third bend portion 160 fits behind the locking tabs at an angle Δ such that the angle Δ and the angle γ sum up to approximately 180°. Because the major opening 105 is completely covered by the cover 170 there is minimal leakage between the cover and the casing 100. There are very few parts involved with this assembly.

Thermal movement between the liner and the case is provided in all directions. The leaf spring 125 acts in tension and compression. The leaf spring 125 hardness and flexibility can be tailored for required loads and because of the tolerances built into the system no shimming or rigging is required.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:
1. A hanger assembly for a gas turbine engine comprising:
a flexible leaf spring having a body and a pair of legs spaced apart by said body,
a locking member attaching said pair of legs to a first duct of the gas turbine engine, said locking member including a cover and a pair of retention members spaced apart by said cover, each of said pair of retention members configured to capture one leg of said pair of legs, and a mounting member attaching said body to a second duct of the gas turbine engine, wherein each of said retention members includes a first flange formed upon said cover and extending from said cover towards said body, and a second flange extending from said first flange at an outer obtuse angle, wherein said first flange and said second flange capture one leg of said pair of legs.

2. The hanger assembly as recited in claim 1, wherein said body includes a circular portion extending therefrom.

3. The hanger assembly as recited in claim 2, wherein said body has an opening therein cooperating with a stud extending from said second duct.

4. The hanger assembly as recited in claim 1, wherein each of said pair of legs includes a first portion that extends from said body at an inner obtuse angle.

5. The hanger assembly as recited in claim 4, wherein each of said pair of legs includes a second portion that extends from said first portion at an inner acute angle.

6. The hanger assembly as recited in claim 5, wherein each of said pair of legs includes a third portion that extends from said second portion at an outer acute angle.

7. The hanger assembly as recited in claim 1, wherein said one leg of said pair of legs has a portion disposed at an acute angle, such portion captured by said first flange and said second flange wherein said acute angle and said outer obtuse angle are complementary to each other.

8. The hanger assembly as recited in claim 7, wherein said second flange is wider than said portion.

9. An exhaust liner assembly for a gas turbine engine, comprising:

a liner defining an inner surface exposed to exhaust gases, and a duct spaced radially outward of the liner; and a hanger assembly supporting the liner relative to the duct, the hanger assembly including a flexible leaf spring having a body and a leg, a locking member attached said leg to said duct, said locking member including a cover partially disposed outside of said duct, and a mounting member attaching said body to said liner, wherein said locking member includes a first flange formed upon said cover and extending from said cover towards said body and a second flange extending from said first flange at an outer obtuse angle, wherein said first flange and said second flange capture said leg.

10. The exhaust liner assembly as recited in claim 9, wherein a first portion of said leg extends from said body at an inner obtuse angle, a second portion of said leg extends from said first portion of said leg at an inner acute angle, and a third portion of said leg extends from said second portion of said leg at an outer acute angle.

11. A gas turbine engine comprising:

a fan section including a plurality of fan blades rotatable about an axis;

a compressor section in communication with the fan section;

a combustor in fluid communication with the compressor section;

a turbine section in fluid communication with the combustor and driving the fan section and the compressor section; and an exhaust liner assembly aft of the turbine section, the exhaust liner assembly including a liner defining an inner surface exposed to exhaust gases, and a duct spaced radially outward of the liner; and a hanger assembly supporting the liner relative to the duct, the hanger assembly including a flexible leaf spring having a body and a leg, a locking member attaching said leg to said duct; and a mounting member attaching said body to said liner; and wherein said locking member includes a cover disposed outside of said duct, a first flange formed upon said cover and extending from said cover towards said body and a second flange extending from said first flange at an outer obtuse angle, wherein said first flange and said second flange capture said leg.

12. The gas turbine engine as recited in claim 11, wherein a first portion of said leg extends from said body at an inner obtuse angle, wherein a second portion of said leg extends from said first portion of said leg at an inner acute angle and wherein a third portion of said leg extends from said second portion of said leg at an outer acute angle.

13. The hanger assembly as recited in claim 11, wherein said leg has a portion disposed at an acute angle, such portion captured by said first flange and said second flange wherein said acute angle and said outer obtuse angle are complementary to each other.

14. The gas turbine engine as recited in claim 11, wherein said body includes a circular portion extending therefrom, said circular portion configured to abut said liner.

15. The gas turbine engine as recited in claim 11, wherein said first flange is configured to extend through an opening defined by said duct, and said cover is configured to span across said opening.

16. The gas turbine engine as recited in claim 15, wherein said cover defines a second axis, said first flange extending in a direction parallel to said second axis, and said first and second flanges being radially inward of said leg relative to said second axis when located in an installed position.

* * * * *